Christian Noack
INVENTOR.

BY

Karl F. Ross
Attorney

United States Patent Office 3,490,555
Patented Jan. 20, 1970

3,490,555
VEHICULAR CHASSIS MOVABLE IN TWO ORTHOGONAL DIRECTIONS
Christian Noack, Guttau, Kreis Bautzen, Germany, assignor to VEB Kombinat Fortschritt, Landmaschinen, Neustadt, Saxony, Germany, a corporation of Germany
Filed Dec. 4, 1967, Ser. No. 687,922
Int. Cl. B62d 5/00
U.S. Cl. 180—79.2
8 Claims

ABSTRACT OF THE DISCLOSURE

To facilitate propulsion of a vehicle in either of two orthogonal directions, e.g. for road travel and for work in the field, two wheel pairs at the minor sides of a rectangular frame are swivelably mounted for rotation about respective vertical axes over an arc of more than 90°. During highway travel, the wheels stand generally parallel to the major sides of the rectangle, the two front wheels being then jointly orientable under the control of the first steering mechanism; in the alternate wheel position generally parallel to the minor sides of the rectangle, a second steering mechanism may operate to deflect either pair of wheels beyond that position into a yawing position in which the wheels include an obtuse angle whose vortex points to the center of the rectangle to determine the inner radius of a curve along which the vehicle is being driven, the wheels on the outside of the curve remaining coplanar.

---

My present invention relates to a chassis for a vehicle adapted to be dirigibly propelled in either of two mutually orthogonal directions, e.g. for use with agricultural equipment designed to cut crops in a swath substantially wider than a vehicular lane of a highway. Harvesters and similar agricultural machinery, having a generally rectangular outline, may thus move in a direction parallel to the major sides of the rectangle when traveling along a road and in a direction perpendicular thereto during work on the field; a harvester of this description is the subject matter of my copending application Ser. No. 687,923 of even date.

The general object of my present invention is to provide means in such vehicle for facilitating the switchover from longitudinal to transverse travel and vice versa while affording full dirigibility with either mode of locomotion.

A more particular object of this invention is to provide a relatively simple steering mechanism, preferably of the hydraulic type, to be used for both the changeover between the two orthogonal directions and the orientation of the wheels when driving along a curved path.

A vehicular chassis designed to realize the aforestated objects comprises the usual front pair and rear pair of wheels near the ends of the respective minor sides of a generally rectangular frame. In accordance with an important feature of my invention, each of these wheels is independently rotatable about a substantially vertical axis, through an angle of more than 90° which encompasses the first or traveling position and the second or working position of the wheels while leaving the same free for further turning to steer the vehicle. According to a more particular feature of my invention, each pair of wheels is provided with an individual linkage adapted to swing the wheels of the respective pair in mutually opposite senses from a parallel position to a coplanar position and therebeyond, releasable stop means being provided to prevent a return from the coplanar to the parallel position. For road travel only one pair of wheels (generally the front wheels) need to be steerable, advantageously with the aid of a fluid-operated piston engaging their aforementioned linkage. For steering during field work, one pair of coplanar wheels remains blocked while the linkage of the other pair is moved away from its stop means in such a manner that these wheels include with each other an obtuse angle whose vertex points toward the center of the rectangle; the two wheels so displaced, no longer coplanar or parallel, then define the inner radius or curvature of the bend into which the vehicle is being steered, the other wheel pair on the outer radius remaining coplanar which is of little consequence because of the relatively large radius of the path which these wheels are called upon to describe.

In order to stabilize the wheels of each pair against lateral deflection by rocks, bumps or other terrain irregularities encountered in the field, I prefer to retain them in their coplanar position against the aforementioned stop means with a biasing force, preferably that of a hydraulic fluid, which must be overcome by an applied steering force whenever the vehicle is to yaw in the direction of the respective wheel pair.

The invention is applicable to self-propelled vehicles as well as to trailers. In the former case, the wheels may be individually equipped with drive motors energized from a common source, preferably fluid motors of the hydrostatic type.

The invention will be described in greater detail with reference to the accompanying drawing in which.

Figure 1:
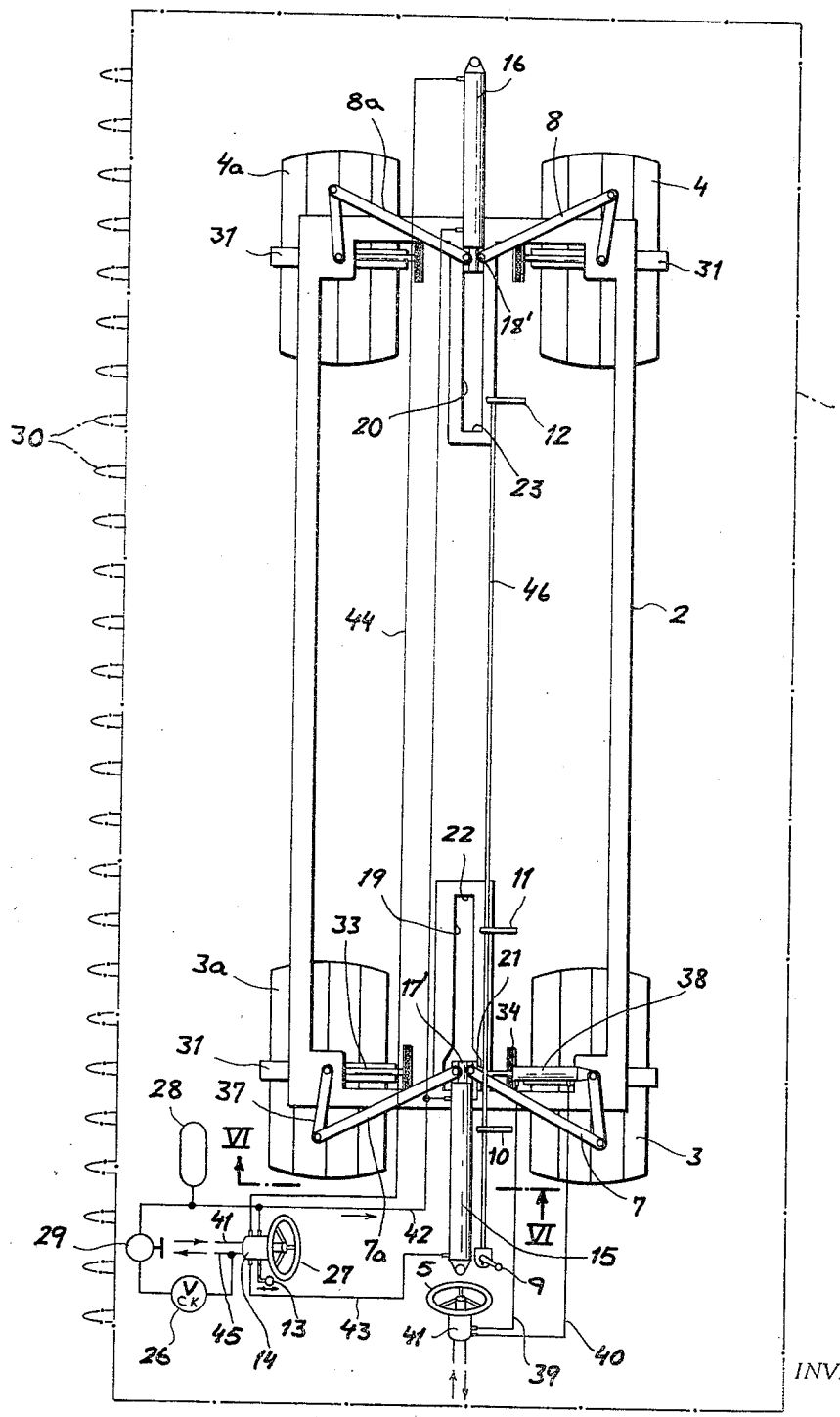
FIG. 1 is a somewhat diagrammatic top plan view of a vehicle equipped with a steering system according to the invention.
Figure 2:
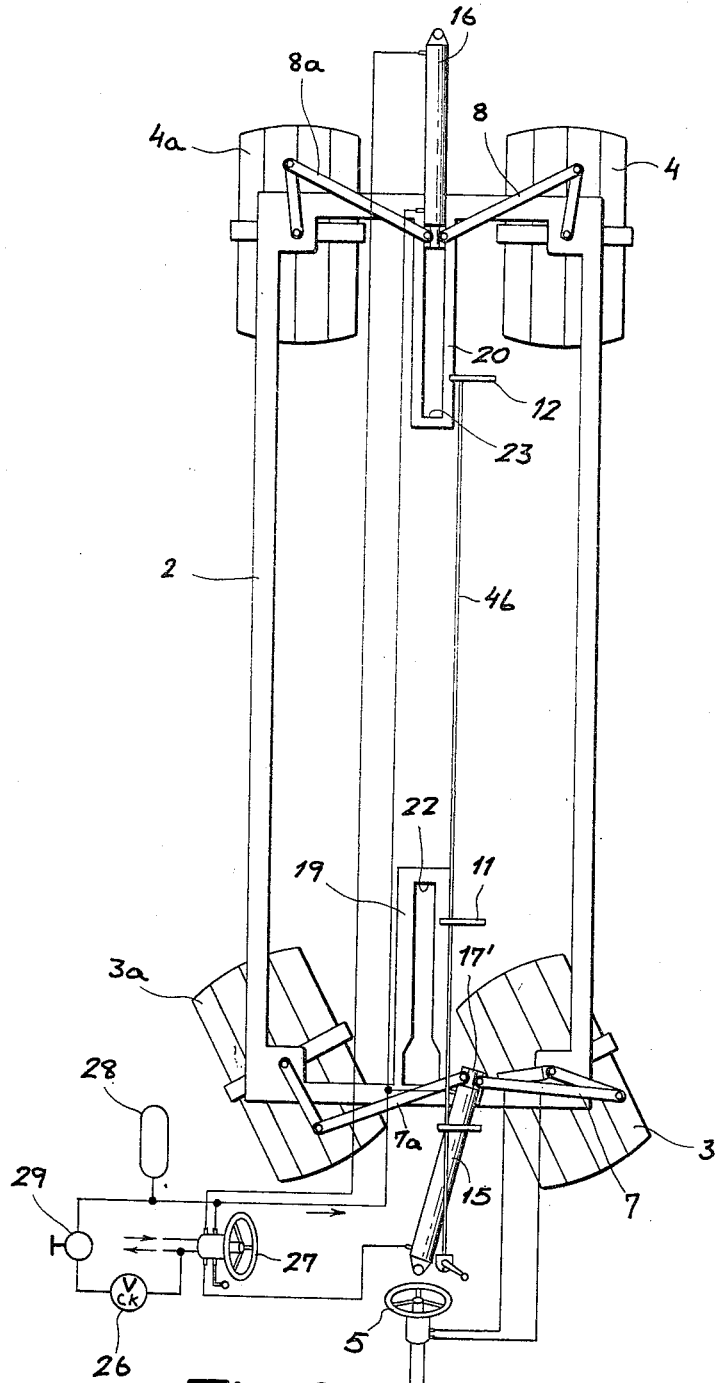
FIGS. 2–5 are views similar to FIG. 1, showing the system in different operating positions.
Figure 3:
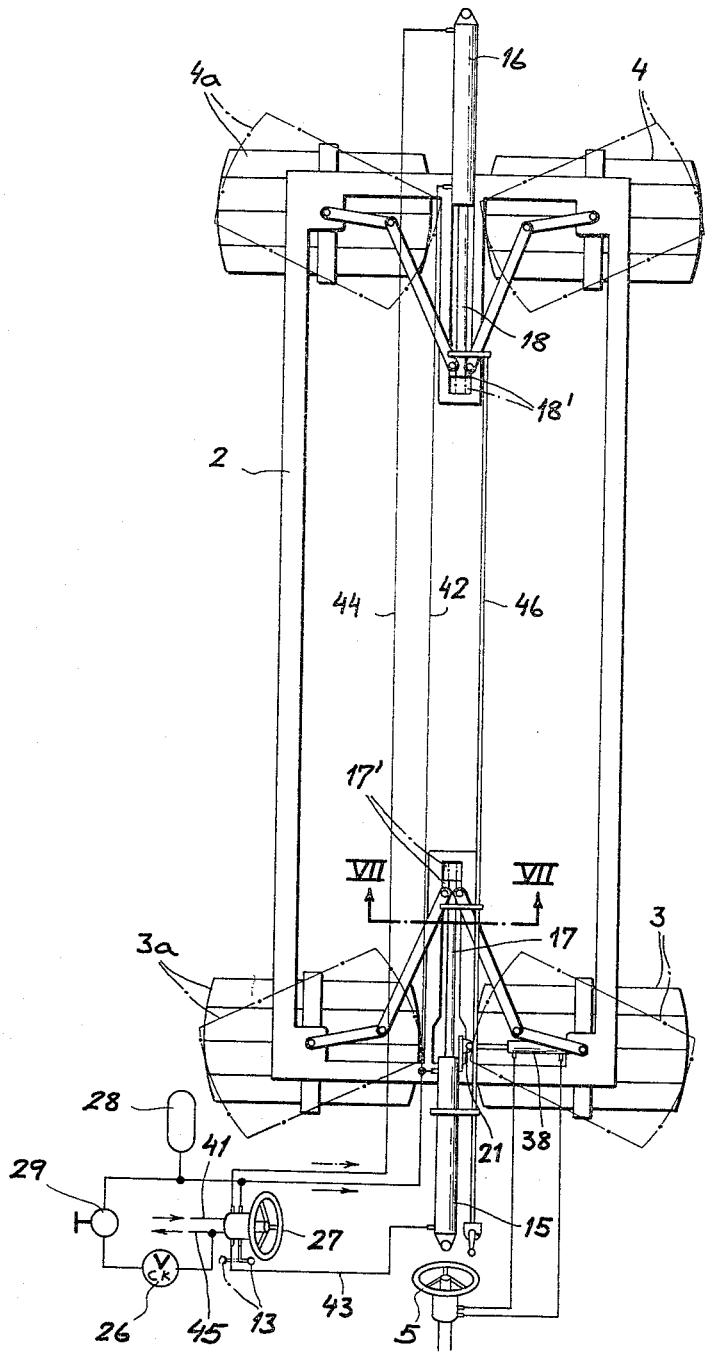

The vehicle shown in the drawing comprises a rectangular frame 2 forming part of a chassis 1 (FIG. 1) of the same general outline, the chassis being supported by two wheel pairs 3, 3a, and 4, 4a swingably mounted near the ends of the minor sides of the frame. The vehicle may be a combine harvester of the type described in my commonly assigned application Ser. No. 687,923 of even date; thus, a cutter bar 30 may extend along almost the entire length of one of the major edges of the rectangular chassis which also accommodates a driver's cab with seats (not shown) near a pair of steering wheels 5 and 27. From this cab, a driver operating the steering wheel 5 overlooks one of the minor sides of the rectangle to steer the vehicle in longitudinal direction along a highway or country road, the traction wheels 3, 3a, 4, 4a being then generally in the position of FIG. 1 for straight forward travel or of FIG. 2 for driving in a curve (here to the left). When seated at steering wheel 27, the driver overlooks the broad side of the vehicle for movement in transverse direction, the traction wheels then occupying the position of FIG. 3 for straight driving, FIG. 4 for veering to the left, of FIG. 5 for veering to the right.

Figure 6:
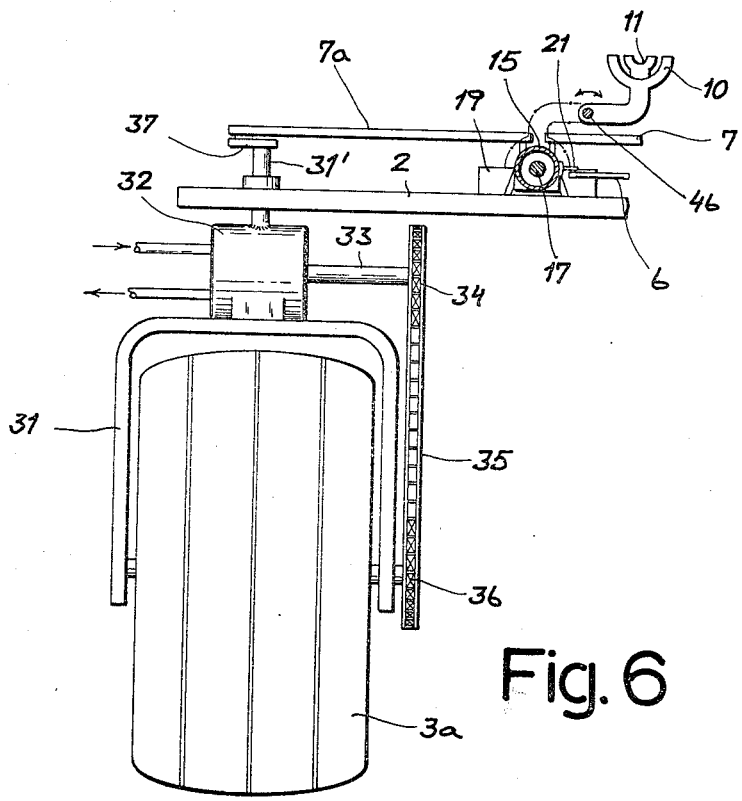
FIG. 6 is a fragmentary cross-sectional view taken on the line VI—VI of FIG. 1.
Figure 7:
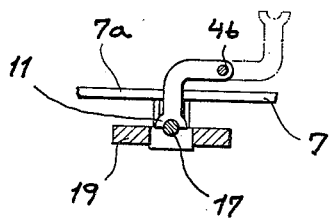
FIG. 7 is a cross-sectional detail view taken on the line VII—VII of FIG. 3.

As best illustrated for the wheel 3a in FIG. 6, each traction wheel is individually mounted on the frame 2 by way of a rotatably journaled fork 31 rigid with an associated hydrostatic motor 32 adapted to be reversibly operated by hydraulic working fluid from a driver-controlled central source, not shown. Motor 32 has a shaft 33 carrying a sprocket wheel 34 which drives the axle of wheel 3a by way of a chain 35 and a similar sprocket wheel 36.

An upward extension 31' of fork 31 is rigid with an arm 37 articulated to a link 7a which, together with a similar link 7 associated with the drive of wheel 3, is hingedly connected with a collar 17' forming an enlarged extremity of a hydraulic piston 17 slidably received in a cylinder 15. In a symmetrical manner, a piston 18 slides in a cylinder 16 and terminates in a junction 18' with a pair of links 8, 8a controlling the positions of wheels 4, 4a. The collar 17' is also provided with a joint 21 to which is hinged a piston 6 slidable in a hydraulic cylinder 38 which is pivotally supported on the frame 2. Cylinder 38 is hydraulically connected, via conduits 39 and 40, to a source of operating fluid through a valve 41 controlled by steering 5 whose rotation in one direction or the other displaces the double-acting piston 6 to swing the cylinder 15 out of its normal position, aligned with cylinder 16, into an off-normal position (FIG. 2) to orient the front wheels 3, 3a in a corresponding direction during road travel. The position of cylinder 16 relative to frame 2 is fixed.

Steering wheel 27 controls another hydraulic valve 14 for the actuation of the two double-acting pistons 17 and 18 in their respective cylinders 15 and 16; the collars 17' and 18' of these pistons are slidably guided, upon outward movement of the respective piston, in a pair of channels 19, 20 having respective end stops 22 and 23. Valve 14 also responds to manual operation of a lever 13 which normally connects a fluid inlet 41 from the aforementioned source with a conduit 42 opening into the proximal ends of cylinders 15, 16 to hold their respective pistons 17, 18 in a retracted position; other conduits 43 and 44, terminating at the distal ends of cylinders 15 and 16, are then vented to a return conduit 45 leading to a sump or to the low-pressure side of the source (e.g. a fluid pump). Conduits 42 and 45 are further interconnected by a hydraulic circuit including a check valve 26, a stopcock 29 and a junction with a pressure accumulator 28; with stopcock 29 closed, the accumulator maintains a substantially constant fluid pressure in line 42 regardless of the position of wheel 27.

Whenever it is desired to shift from road travel to field work, lever 13 is briefly moved into its alternate position (dot-dash lines, FIG. 3) in which inlet 41 is connected with lines 43, 44 whereas line 42 is vented to outlet 45; to accelerate the switchover, stopcock 29 may be temporarily opened to discharge the pressure accumulator 28. This operation extends the pistons 17 and 18 to the limit of their stroke, with their collars 17' and 18' abutting the stops 22 and 23. At this point the steering wheel 5 must be centered to keep the cylinder 15 aligned with the guide track 19. In order to prevent accidental dislodgment of the swingable cylinder 15 from this aligned position, a handle 9 is now actuated to swing a fork 10 on a rod 46 into a position straddling the cylinder 15; this has been indicated by dot-dash lines in FIG. 6. At the same time, two further forks 11 and 12 on rod 46 fall into place behind the extended collars 17', 18' to block the return of the pistons 17, 18 into their withdrawn position of FIGS. 1 and 2. At this stage the four traction wheels extend generally diagonally outwardly (dot-dash lines, FIG. 3), i.e. they assume the positions illustrated in FIG. 4 for wheels 3, 3a and in FIG. 5 for wheels 4, 4a, so that no locomotion in any direction is possible. Upon subsequent restoration of handle 13 to normal, fluid pressure returns to line 42 to move the pistons 17 and 18 slightly inwardly so that their collars 17' and 18' come to rest against the stops 11 and 12, respectively; in this position the two wheels 3, 3a and 4, 4a of each pair are coplanar as shown in full lines in FIG. 3. The vehicle is now ready for movement in the transverse direction.

Figure 4:
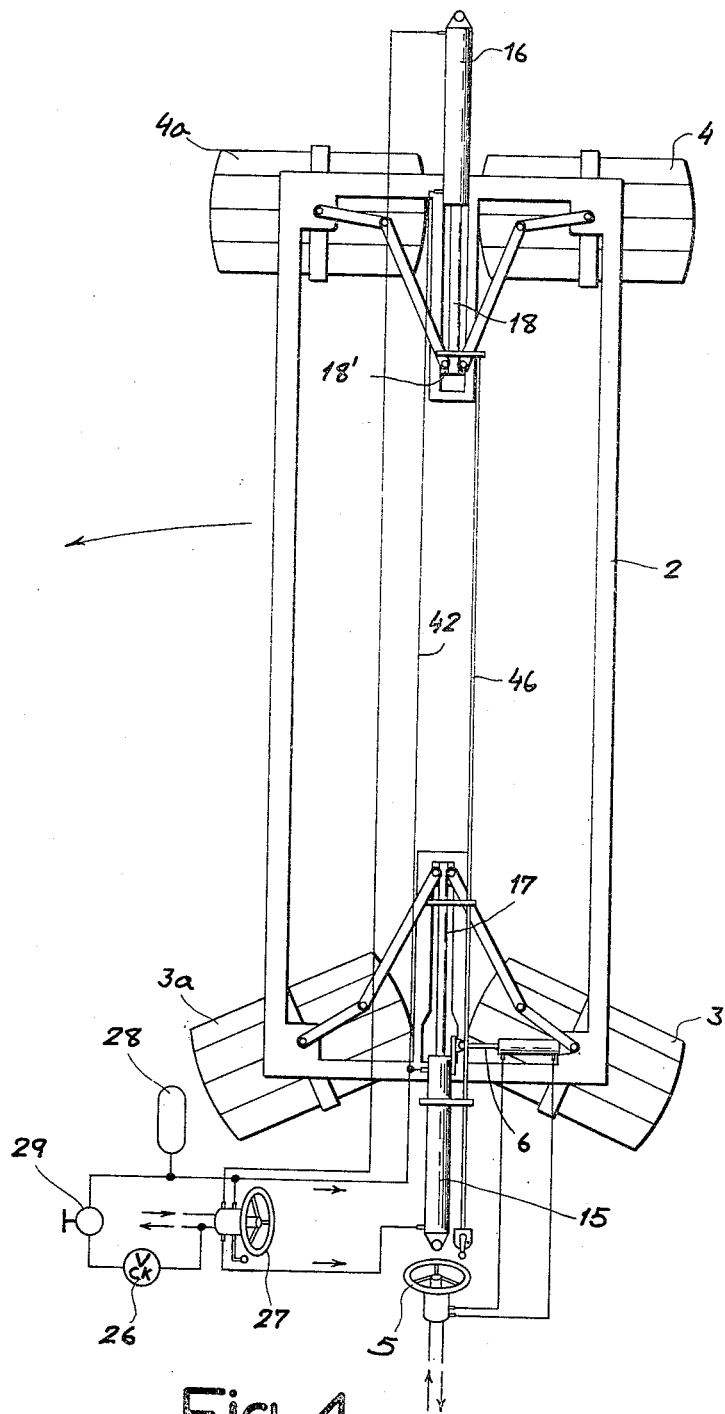
Figure 5:
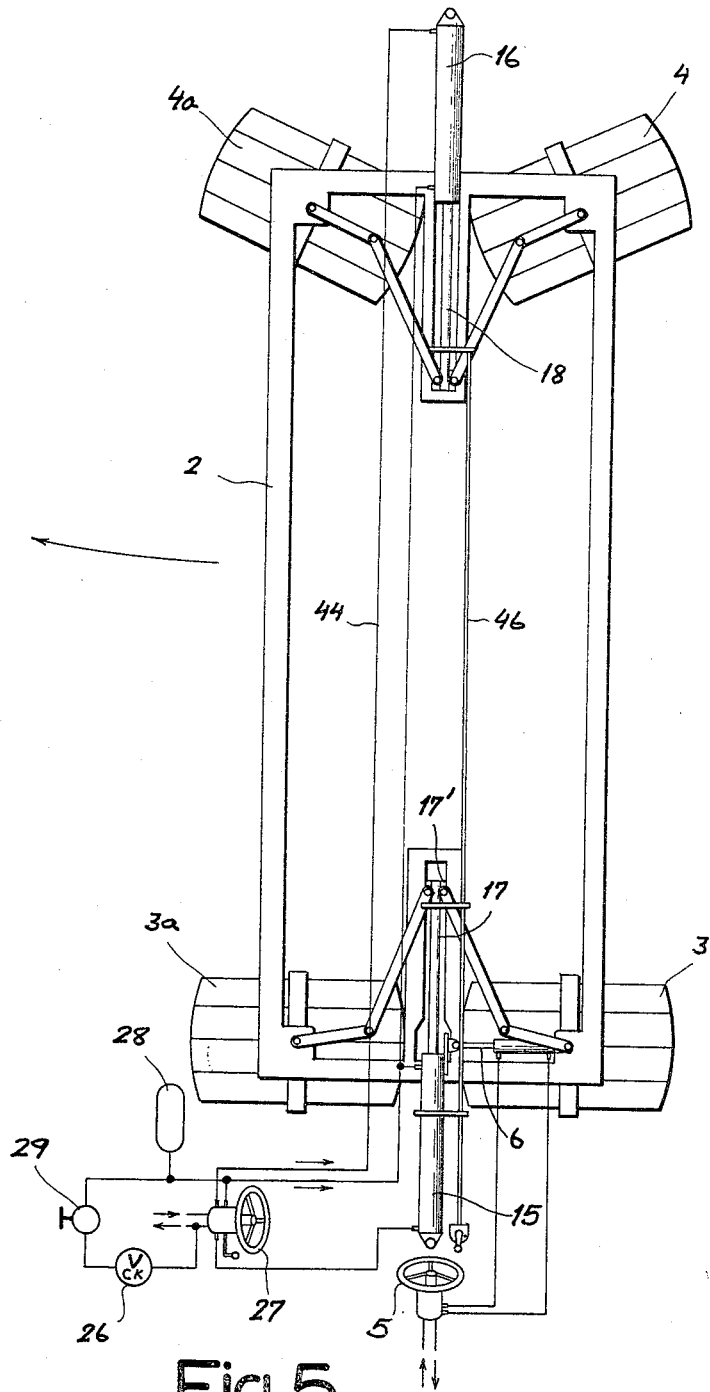

If the wheel 27 is thereafter turned to the left, pressure in line 43 overrides the pressure in line 42 to drive the piston 17 outwardly against its stop 22, thereby again imparting to the wheels 3, 3a a generally diagonally outward position; the vehicle will now swing to the left as indicated by the arrow in FIG. 4. Conversely, a turning of wheel 27 to the right admits an overriding fluid pressure to line 44 to extend the piston 18 to the limit of its stroke, i.e. into contact with end stop 23, whereby the wheels 4, 4a are toed outwardly for a yawing to the right as indicated by the arrow in FIG. 5. If desired these veering motions could be enhanced by a selective increase in the speeds of the wheels on the outside of the curve, i.e. the coplanar wheels 4, 4a in FIG. 4 or 3, 3a in FIG. 5.

As described in my copending application identified above, cuttings from mower 30 may be further processed by threshing and winnowing equipment extending over the major length of the frame 2, the grains being then received in a storage bin disposed substantially centrally of the frame at a low level so that the vehicle will have a low center of gravity and will therefore be stable when used either in the field or on the road. Further possible fields of application include manure spreaders and other agricultural equipment, mobile drill rigs, repair platforms and the like.

To condition the system again for road travel, handle 9 is restored to withdraw the stops 11, 12 whereupon the pressure of the hydraulic fluid from accumulator 28 re-establishes the position of pistons 17, 18 shown in FIG. I.

I claim:
1. A vehicular chassis dirigibly propellable in either of two orthogonal directions, comprising:
   a generally rectangular frame with two minor sides and two major sides;
   a first pair of wheels near the ends of one of said minor sides;
   a second pair of wheels near the ends of the other of said minor sides;
   swivelable mounting means for each of said wheels permitting rotation thereof about a substantially vertical axis over a range of more than 90°;
   a first linkage interconnecting the wheels of said first pair for joint swinging in opposite directions;
   a second linkage interconnecting the wheels of said second pair for joint swinging in opposite directions;
   control means including said first and second linkages for jointly swinging all of said wheels between a first position generally parallel to said major sides and a second position generally parallel to said minor sides;
   first steering means effective in said first position for imparting joint yawing motion to said first pair of wheels during travel of the vehicle in longitudinal direction of the rectangle;
   and second steering means effective in said second position for alternately operating said linkages to displace said first linkage with immobilization of said second linkage and to displace said second linkage with immobilization of said first linkage, each linkage thus displaced moving the wheels of the associated pairs beyond said second position into a nonparallel position in which the wheels so moved include with each other an obtuse angle pointing toward the center of the rectangle.

2. A chassis as defined in claim 1 wherein said second steering means includes a pair of fluid-operated pistons respectively engaging said first and second linkages.

3. A chassis as defined in claim 1 wherein said first steering means comprises a fluid-operated piston engaging said first linkage.

4. A chassis as defined in claim 1 wherein said control means further includes removable stop means engageable with said linkages for preventing a return of said wheels from said second position into said first position.

5. A chassis as defined in claim 4 wherein said second steering means includes biasing means tending to maintain said linkages in contact with said stop means in said second position of said wheels.

6. A chassis as defined in claim 5 wherein said second actuating means includes a first fluid-operated piston for said first linkage and a second fluid-operated piston for said second linkage, said biasing means comprising a source of fluid under pressure bearing unidirectionally upon said pistons.

7. A chassis as defined in claim 6 wherein said first piston is provided with a swingable cylinder mechanically coupled with said first steering means.

8. A chassis as defined in claim 7, further comprising manually operable means coupled with said stop means for arresting said swingable cylinder in a centered position while making said stop means effective to block the return of said linkages to said first position.

References Cited

UNITED STATES PATENTS

| 1,214,968 | 2/1917 | Steele | 180—45 |
| 2,863,518 | 12/1958 | Pellizzetti | 180—45 X |
| 3,087,564 | 4/1963 | Quayle | 280—91 X |
| 3,197,229 | 7/1965 | Houlton | 180—79.2 X |
| 3,315,759 | 4/1967 | Bohlen | 180—79.2 |

LEO FRIAGLIA, Primary Examiner

JOHN A. PEKAR, Assistant Examiner